US006168303B1

(12) United States Patent
Ashizawa et al.

(10) Patent No.: US 6,168,303 B1
(45) **Date of Patent: *Jan. 2, 2001**

(54) VEHICULAR LAMP

(75) Inventors: Kazuhisa Ashizawa; Toshio Tanaka, both of Shizuoka (JP)

(73) Assignee: Koito Manufacturing Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/138,519

(22) Filed: Aug. 24, 1998

(30) Foreign Application Priority Data

Sep. 2, 1997 (JP) .................................................. 9-236694

(51) Int. Cl.[7] ............................... B60Q 1/04; F21V 29/00

(52) U.S. Cl. ........................... 362/547; 362/294; 362/373

(58) Field of Search .............................. 362/96, 547, 294, 362/373, 345

(56) References Cited

U.S. PATENT DOCUMENTS 5,285,358 2/1994 Watanabe et al. ................... 362/547
5,367,438 * 11/1994 Deslandres ........................... 362/547
5,611,612 3/1997 Choji et al. .......................... 362/547
5,649,762 * 7/1997 Dobler ................................ 362/294

* cited by examiner

*Primary Examiner*—Y. Quach
(74) *Attorney, Agent, or Firm*—Sughrue, Mion, Zinn, Macpeak & Seas, PLLC

(57) ABSTRACT

A vehicular lamp equipped with an extension for covering a gap formed between a lamp body and a reflector. To improve air circulation, the extension includes a lower frame portion which has openings for communicating the area proximate the inner face of the lens with a back area of the extension. The openings are located at left and right positions of the frame portion, respectively. Furthermore, venting holes for communicating between the inside and outside of the lamp body are formed in the lamp body at positions opposed to the openings, and a shroud for introducing air flow along the inner face of the lamp body extends between the venting holes and the openings. The openings ensure a sufficient amount of air flow in the vicinity of the inner face of the lens. Thus, it is possible to prevent the inner face of the lens from becoming misted due to dew condensation.

10 Claims, 4 Drawing Sheets

VEHICULAR LAMP

BACKGROUND OF THE INVENTION

1. Field of the Invention

The present invention relates to a vehicular lamp and, more particularly, to a vehicular lamp designed to prevent the lens surface from becoming misted.

2. Description of the Related Art

A conventional vehicular headlamp includes a lamp body and a lens attached to a front opening portion of the lamp body so that a substantially airtight lamp chamber is achieved. Therefore, when the temperature in the lamp chamber drops after the headlamp has been turned off, the inner face of the lens experiences dew condensation due to saturated aqueous vapor. As a result, the lens becomes misted so that the outward appearance of the lamp is poor. To prevent the lens from becoming misted, a construction for preventing dew condensation has been proposed wherein the lamp is provided with venting holes for introducing atmospheric air into the lamp chamber.

For example, FIG. 4 schematically illustrates a cross section of one such construction. Referring to FIG. 4, a lens 2 is attached to the lamp body 1 so as to cover a front opening portion 11 thereof. As a result, a lamp chamber is defined by the lamp body 1 and the lens 2. A reflector 4 is disposed within the lamp chamber, and a bulb 6 is attached to the reflector 4 via a bulb socket 5. Furthermore, there is provided a shade 7 for moderating the light emitted forwardly from the bulb 6. The lamp body 1 has openings 18 formed in a lateral face or a back face thereof. The openings 18, which serve as exhaust holes or venting holes, communicate the lamp chamber with the atmosphere.

Due to various demands imposed on the design of vehicles, vehicular lamps in recent years have complicated shapes instead of simple shapes such as circular or rectangular. In many cases, such vehicular lamps are provided with a lamp body with its corner portion having a narrow area. This narrow area adversely affects circulation of the atmospheric air, so that the aforementioned venting holes cannot effectively prevent a lens surface from becoming misted.

Referring to FIG. 4, the lamp is constructed in such a manner that the reflector 4 is formed separately from the lamp body 1 so as to allow adjustment of the optical axis of the bulb 6 by simply tilting the reflector. In such a construction, in order to enable the reflector 4 to be tilted, it is necessary to provide a gap S between the inner face of the lamp body 1 and a front edge portion 4*a* of the reflector 4. If the gap S is visible from the outside, the overall outward appearance is deteriorated. Accordingly, an extension 8X is provided to cover the gap S. Specifically, the extension 8X is disposed along the inner face of the front opening portion 11 of the lamp body 1. In this state, the extension 8X is also disposed quite close to the lens 2, along the inner peripheral face thereof. Therefore, as can be seen from FIG. 4, the air circulation is reduced in the vicinity of an area Y that is close to the inner face of a side portion or a corner portion of the lens 2. Since air stagnates in this area Y, the inner face of the lens 2 tends to experience dew condensation so that it is difficult to prevent the lens 2 from becoming misted. In addition, in comparison with other areas, the heat emitted by the bulb 6 has little effect on a lower side area of the lens 2, which is at a great distance from the bulb 6. This especially holds true for both lateral areas of the lower side of the lens 2. As a result, these areas are at a lower temperature than the other areas, and thus tend to suffer the most from dew condensation, which inevitably causes the lens 2 to become misted. For this reason, it is difficult to prevent the lower side area of the lens 2 as well as the lateral areas of the lens 2 from becoming misted.

It is thus an object of the present invention to provide a vehicular lamp that can effectively prevent a lens of a lamp equipped with an extension from becoming misted.

SUMMARY OF THE INVENTION

To achieve the aforementioned object, the present invention provides a vehicular lamp equipped with an extension for covering a gap formed between an inner face of a lamp body and a reflector, wherein the extension is provided with openings for connecting an area proximate to an inner face of the lens with a rear area of the extension. The openings are formed in a lower frame portion of the extension, which is not visible from outside through the lens. The openings may be formed in the lower frame portion at left and right positions thereof respectively. In addition, the lamp body may be provided with venting holes for communicating the inside and outside of the lamp body at positions opposed to the aforementioned openings respectively, and a shroud for introducing air flow along the inner face of the lamp body may extend between the venting holes and the openings.

BRIEF DESCRIPTION OF THE DRAWINGS

The foregoing and further objects, features and advantages of the present invention will become apparent from the following description of a preferred embodiment with reference to the accompanying drawings, wherein.

DESCRIPTION OF THE PREFERRED EMBODIMENTS

Figure 1:
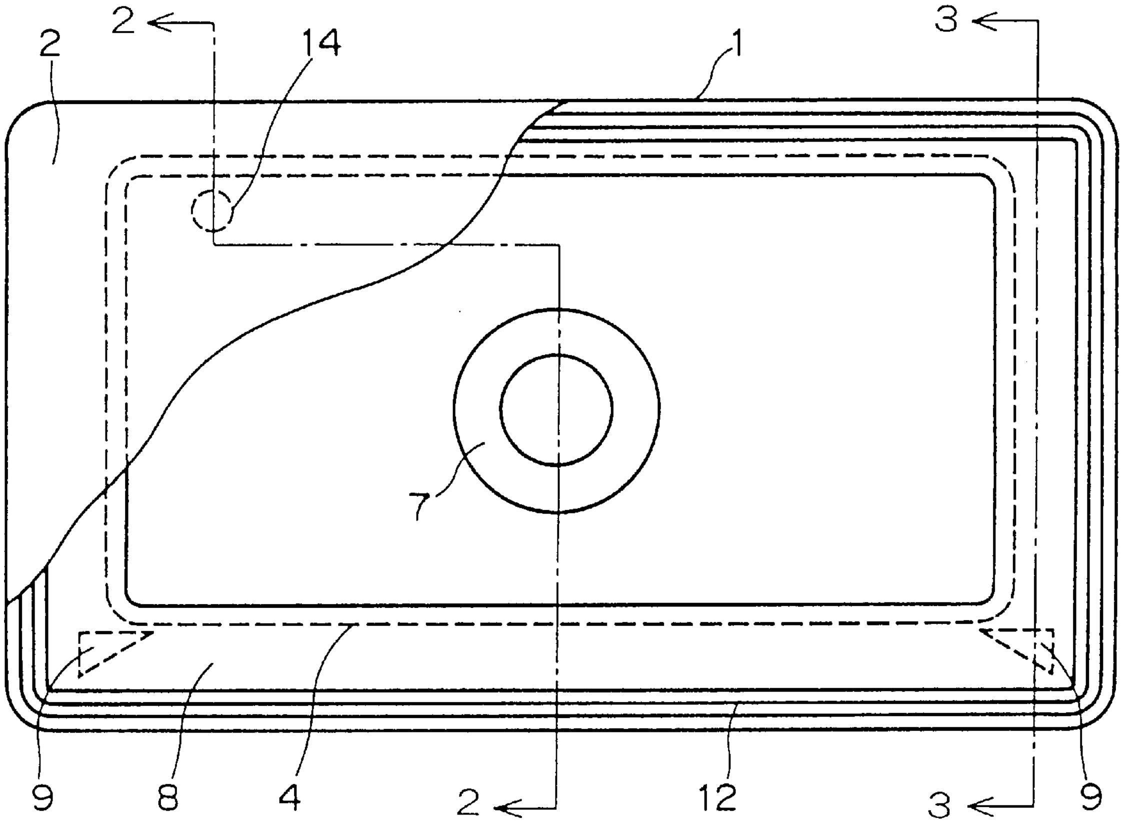
FIG. 1 is a front view of a lamp according to one embodiment of the present invention.
Figure 2:
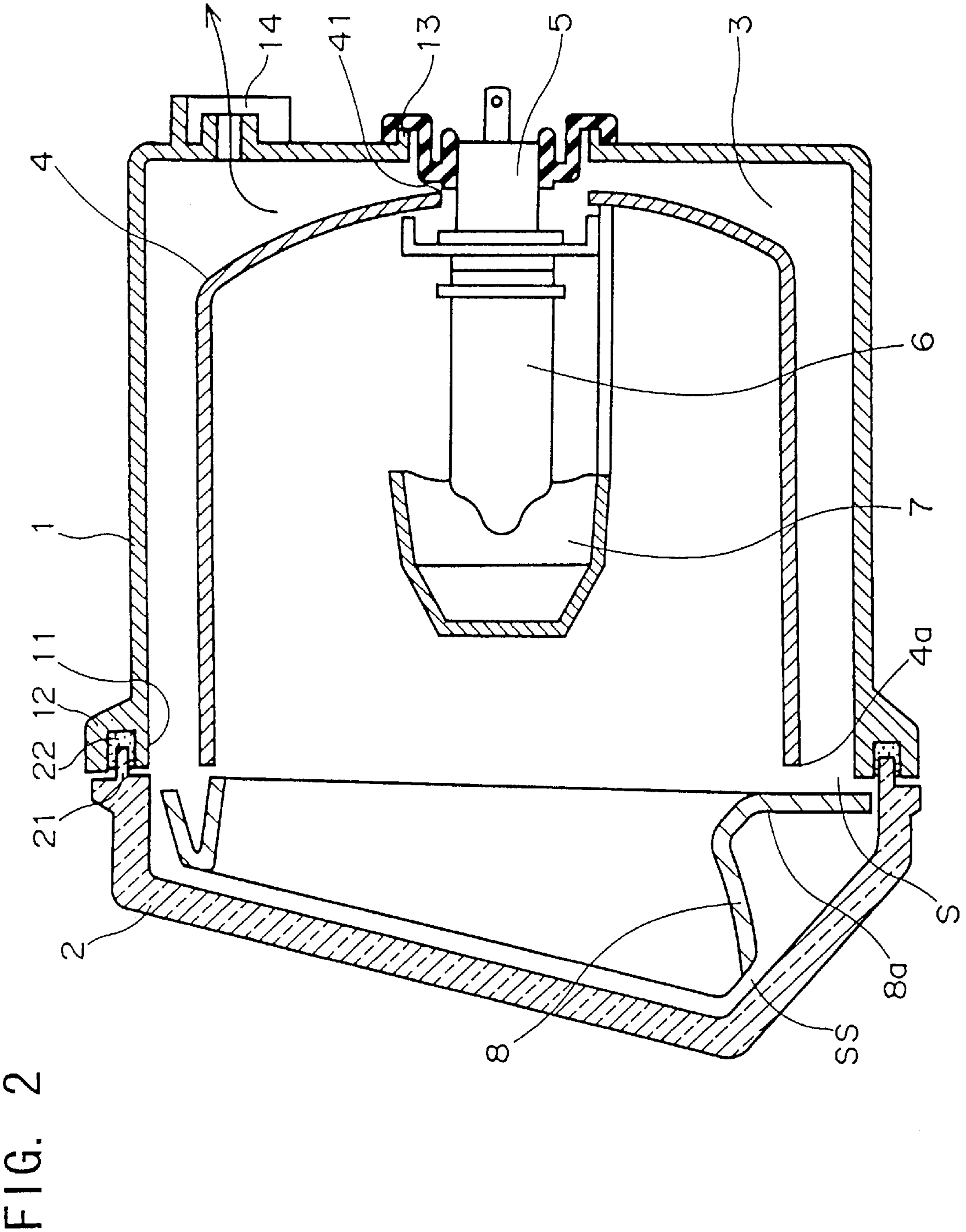
FIG. 2 is an enlarged sectional view taken along line 22 of FIG. 1.
Figure 3:
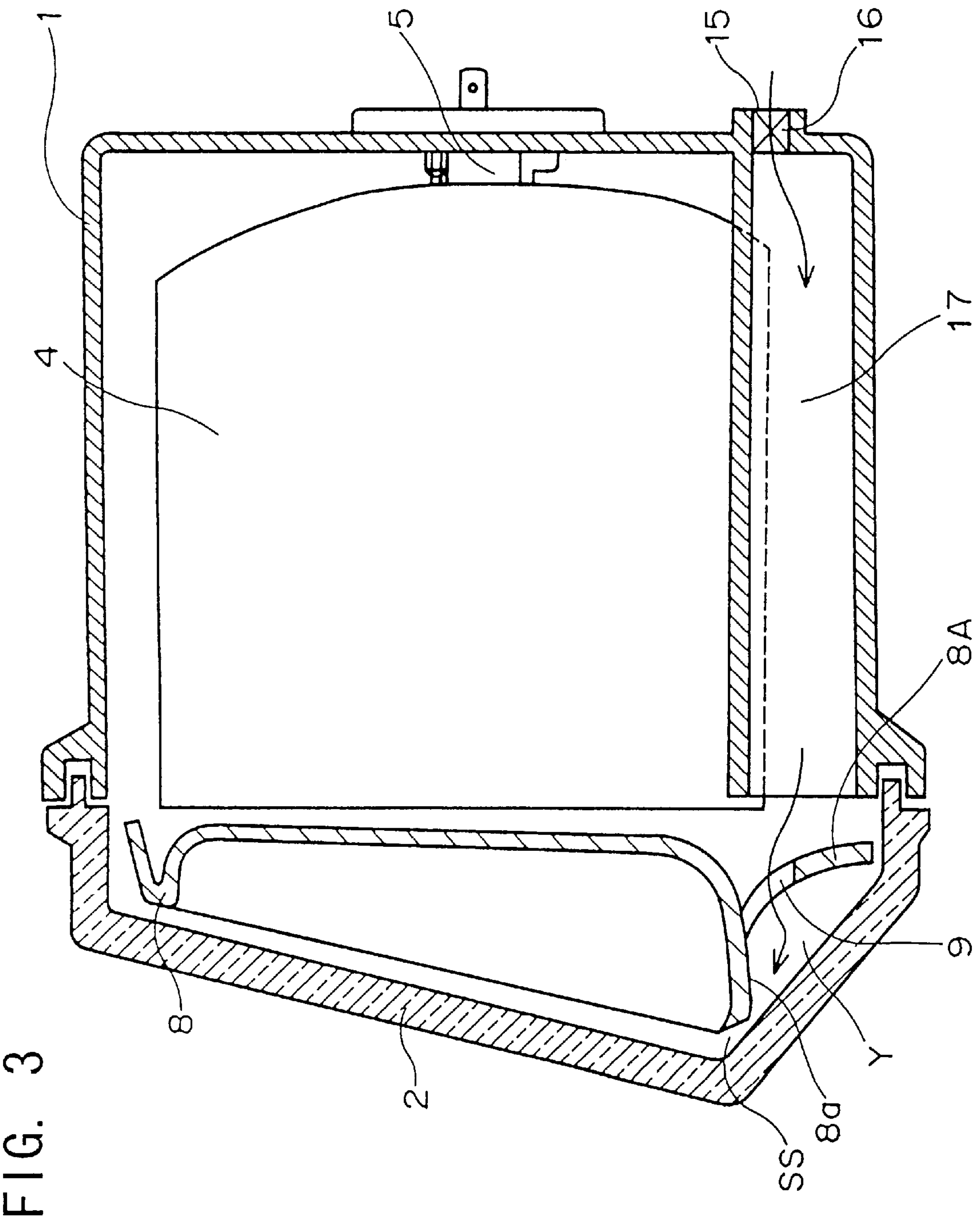
FIG. 3 is an enlarged sectional view taken along line 33 of FIG. 1.
Figure 4:
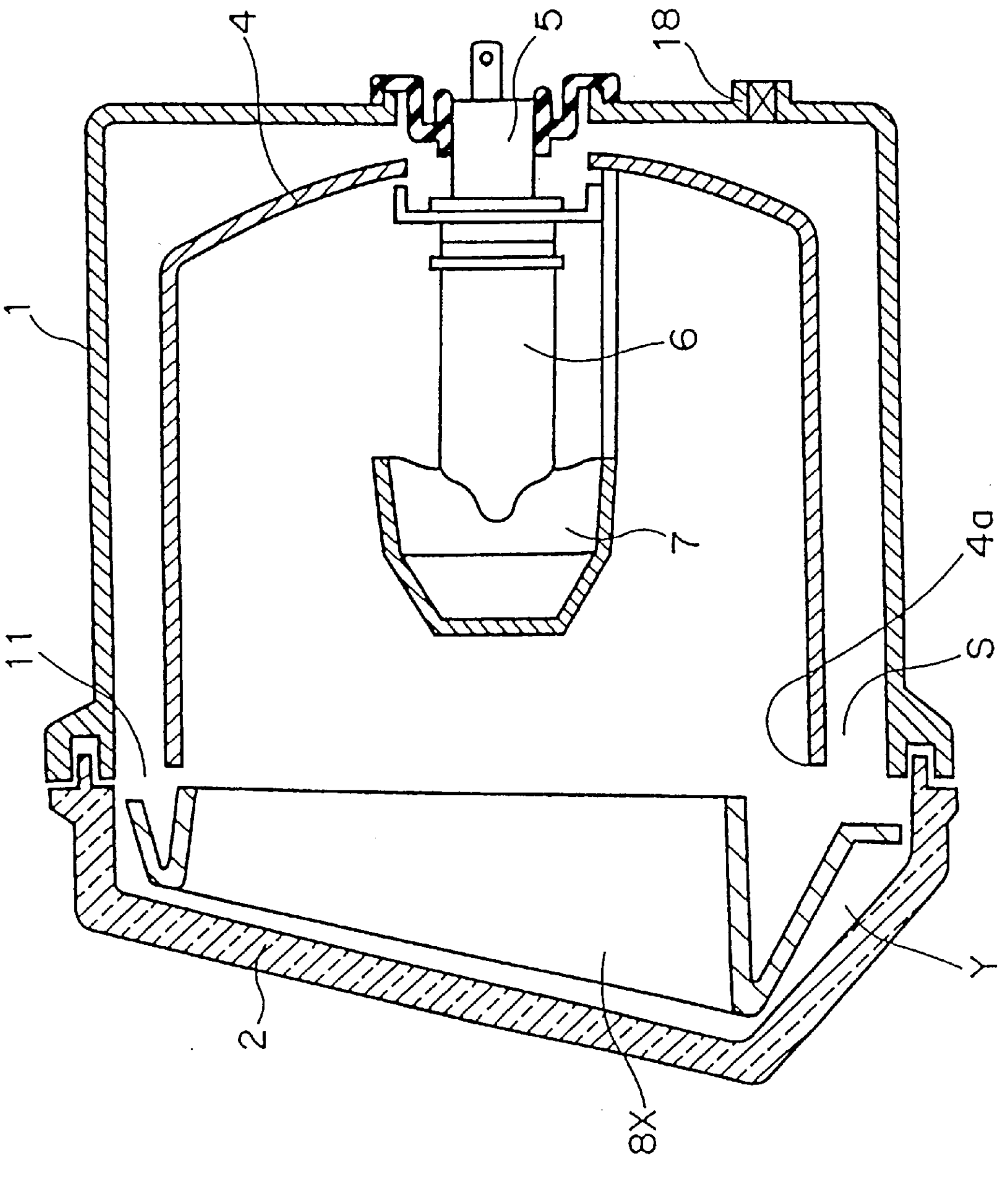
FIG. 4 PRIOR ART
FIG. 4 is an enlarged longitudinal sectional view of an example of a lamp according to the related art.

A preferred embodiment of the present invention will hereinafter be described with reference to the accompanying drawings. FIG. 1 is a partially cutaway front view of a vehicular lamp according to an embodiment of the present invention. FIG. 2 is a partially enlarged view taken along line 2—2 of FIG. 1. FIG. 3 is a partially enlarged view taken along line 3—3 of FIG. 1.

The vehicular lamp includes a lamp body 1, made of resin, having a front opening portion 11 with a sealing groove 12. A lens 2 has a sealing leg portion 21 formed along the periphery thereof. The sealing leg portion 21 is received in the sealing groove 12 and secured by sealing agent 22. Thus, the lens 2 is attached to the lamp body 1 in such a manner as to cover the front opening 11, whereby a lamp chamber 3 of the headlamp is defined by the lamp body 1 and the lens 2. A reflector 4, the effective reflecting surface of which is in the shape of a paraboloid, is disposed within the lamp chamber 3. Although not shown, an aiming mechanism is capable of adjusting the optical axis of the reflector 4 in vertical and lateral directions. A bulb socket 5 is fitted into a socket attachment hole 41 formed in a back face of the reflector 4. The bulb socket 5 retains a bulb 6 as a light source at the focal point of the reflector 4. The bulb 6 and the bulb socket 5 are removably fixed insertion through a bulb insertion hole 13 formed in a back face of the lamp body 1.

A shade 7 for moderating light emitted from the bulb 6 is disposed forward of the bulb 6.

To ensure that a gap S formed between the front edge portion 4*a* of the reflector 4 and the inner face of the lamp body 1 is not visible from outside through the lens 2, an extension 8, in the shape of a frame, is disposed along the front edge portion 4*a* of the reflector 4 and securely supported on the inner face of the lamp body 1. The extension 8 is formed by means of a plastic molding. The surface of the extension 8 is coated with aluminum or subjected to vapor deposition in the same manner as the reflecting surface of the reflector 4. When the lamp chamber 3 is viewed from outside through the lens 2, it looks as if the reflector 4 and the extension 8 are integrally formed. Thus, the presence of the gap S does not interfere with the overall outward appearance of the lamp. Although the extension 8 is located quite close to the inner face of the lens 2 on all sides, there is a small gap SS provided between the lens 2 and the extension 8.

Openings 9 for communicating the front and back sides of the extension 8 with each other are formed in a lower side portion 8*a* thereof at left and right positions. In particular, according to the present embodiment, a lower frame portion 8A for supporting the extension 8 on the lamp body 1 protrudes inwardly (i.e., toward the rear of the lamp body) and downwardly from the back side of the lower side portion 8*a* such that the lower frame portion 8A is not visible through the lens from the outside. The lower frame portion 8A and the lower side portion 8*a* together form a cross section in the shape of Y. The openings 9 are formed in the lower frame portion 8A at respective positions close to an intersecting line of the lower side portion 8*a* and the lower frame portion 8A. Therefore, even in the case where the extension 8 is supported with the lower frame portion 8A in contact with the lower inner face of the lamp body 1, the lower side portion 8*a* is subjected to air flow due to the openings 9 communicating the front and back sides of the lower frame portion 8A.

In addition, the openings 9 serve to reduce the volume of resin forming an intersection of the lower side portion 8*a* and the lower frame portion 8A. It is thus possible to prevent "shrinkage cavities" from being generated in the surface of the lower side portion 8*a* at the time of plastic molding.

Referring to FIGS. 1–3, exhaust holes 14 for communicating the lamp chamber 3 with the atmosphere are formed in the back face of the lamp body 1 at upper positions thereof. Also, venting holes 15 for communicating the lamp chamber 3 with the atmosphere are formed in the back face of the lamp body 1 at left and right lower positions thereof. In the present embodiment, these positions are opposed to the openings 9 formed in the extension 8. A filter 16 for preventing the entrance of dust is securely fitted into each of the venting holes 15. Furthermore, a shroud (wall) 17 is formed integrally with the inner face of the lamp body 1. The shroud 17 extends from the venting holes 15 to the openings 9 formed in the extension 8. In the lamp chamber 3, the shroud 17 defines a duct extending in the fore-to-aft direction of the lamp body 1 to communicate the venting holes 15 with the openings 9. With this construction, air circulates through the exhaust holes 14 and the venting holes 15, which communicate between the inside and the outside of the lamp body 1. Thus, the air is heated to a high temperature in the lamp chamber 3 and is discharged into the atmosphere through the exhaust holes 14 due to convection. In contrast, the atmospheric air flows into the lamp chamber 3 through the venting holes 15. The circulating air inside the lamp chamber 3 prevents the inner face of the lens 2 from experiencing dew condensation so that the lens 2 will not be misted.

In the aforementioned lamp, the air is able to circulate in the vicinity of the lower side area and both lateral areas of the lens 2, which is covered with the extension 8 over a wide area thereof. Specifically, the openings 9 formed in both the lateral areas of the extension 8 communicate between the front and back sides of the extension 8. In other words, the openings 9 connect the area Y, adjacent the inner face of the lens 2, with the inside of the lamp body 1. Thus, the air circulation is improved between the area Y defined by the inner face of the lens 2 and the inside of the lamp body 1. Accordingly, a sufficient amount of air circulates in the vicinity of the lower step areas of the lens 2 and the lower side area of the lens 2. The lower side area of the lens 2 leads to the aforementioned lower lateral areas along the lower side portion 8*a* of the extension 8. Consequently, the inner face of the lens 2 is prevented from becoming misted in those areas.

In addition, the present embodiment provides the shroud 17 defining the duct connecting the openings 9 with the venting holes 15. Thus, the fluid flow of the air between the openings 9 and the venting holes 15 is enhanced, whereby the atmospheric air entering the venting holes 15 smoothly flows along the shroud 17 and reaches the lower side area and both the lateral areas of the lens 2. As a result, it is possible to actively prevent the lens 2 from being misted in those areas.

The openings 9 are formed simultaneously with the plastic molding of the extension 8. This particularly prevents the generation of "shrinkage cavities" in the intersecting section of the lower side portion 8*a* and the lower frame portion 8A. Thus, there is no possibility of such "shrinkage cavities" being exposed to the front side of the extension 8, so that the overall outward appearance is not deteriorated. However, if such "shrinkage cavities" do not present a problem and if it is difficult to form the openings by means of plastic molding due to the restrictions imposed on the design of a mold, the openings may be formed in a separate process after the extension has been formed. Further, although the openings are formed in the lower side portion of the extension at left and right positions thereof, respectively, according to the aforementioned embodiment, the present invention is not limited to such a construction. It is also possible to form the openings at arbitrary positions opposed to lens surface portions that tend to become misted. It is to be noted, however, that the openings should not be visible from outside through the lens.

As has been described above, according to the present invention, the openings for connecting the area close to the inner face of the lens with the back area of the extension are formed in the extension, which covers the gap formed between the inner face of the lamp body and the reflector. It is thus possible to ensure good air circulation in the area close to the inner face of the lens, and to prevent the inner face of the lens from becoming misted due to dew condensation. In particular, the openings are formed in the lower frame portion of the extension that is not visible through the lens from outside. It is thus possible to effectively prevent the lower side area of the lens from becoming misted, despite the fact that the lower side area of the lens tends to become misted easily. Furthermore, in the case where the openings are formed in the lower frame portion of the extension at left and right positions thereof respectively, it is possible to reliably prevent both the lower lateral areas of the lens from becoming misted, despite the fact that those areas are most likely to become misted. In addition, the venting holes for connecting inside and outside of the lamp body are formed in the lamp body at positions opposed to the openings, and the shroud for introducing air flow along the inner face of the lamp body extends between the venting holes and the openings. In this case, it is possible to discharge the stagnant air in the vicinity of the inner face of the lens to the outside of the lamp body through the openings and the venting holes, and to more effectively prevent the lens from being misted.

While the present invention has been described with reference to what is presently considered to be a preferred embodiment thereof, it is to be understood that the present invention is not limited to the disclosed embodiments or constructions. To the contrary, the present invention is intended to cover various modifications and equivalent arrangements. In addition, while the various elements of the disclosed invention are shown in various combinations and configurations, which are exemplary, other combinations and configurations, are also within the spirit and scope of the present invention.

What is claimed is:

1. A vehicular lamp comprising:

a lamp body having a lamp chamber with a front opening portion;

a lens attached to said front opening portion of the lamp body to define said lamp chamber;

a reflector and a light source disposed within said lamp chamber; and an extension, within said lamp chamber, for covering a gap formed between an inner face of said lamp body and said reflector, said extension having an opening therein, wherein communication between an area proximate to an inner face of said lens with a back area that is behind said extension is through said opening and said back area is within said lamp chamber.

2. The vehicular lamp body according to claim 1, wherein said extension is coated with a reflective coating.

3. A vehicular lamp comprising:

a lamp body having a lamp chamber with a front opening portion;

a lens attached to said front opening portion of the lamp body to define said lamp chamber;

a reflector and a light source disposed within said lamp chamber; and an extension for covering a gap formed between an inner face of said lamp body and said reflector, wherein said extension has at least one opening therein for communicating an area proximate to an inner face of said lens with a back area behind said extension, and wherein said extension includes a lower frame portion which is not visible through said lens from an outside of said lamp body, and wherein said opening is formed in said lower frame portion of said extension.

4. The vehicular lamp according to claim 2, wherein said extension has at least two openings that are formed in said lower frame portion at left and right positions thereof respectively.

5. The vehicular lamp according to claim 4, wherein said lamp body is provided with at least two venting holes for communicating between an inside and the outside of said lamp body, said venting holes being located in opposition to said openings, respectively, and wherein a shroud for introducing air flow along the inner face of said lamp body extends between said venting holes and said openings.

6. The vehicular lamp according to claim 3, wherein said lamp body is provided with a venting hole for communicating between an inside and an outside of said lamp body, said venting hole being located in opposition to said opening, and wherein a shroud for introducing air flow along the inner face of said lamp body extends between said venting hole and said opening.

7. The vehicular lamp body according to claim 3, wherein said lower frame portion supports said extension with respect to said lamp body.

8. A vehicular lamp comprising:

a lamp body having a lamp chamber with a front opening portion;

a lens attached to said front opening portion of the lamp body to define said lamp chamber;

a reflector and a light source disposed within said lamp chamber; and an extension for covering a gap formed between an inner face of said lamp body and said reflector, wherein said extension has an opening therein for communicating an area proximate to an inner face of said lens with a back area behind said extension, and wherein said lamp body is provided with a venting hole for communicating between an inside and an outside of said lamp body, said venting hole being located in opposition to said opening, and wherein a shroud for introducing air flow along the inner face of said lamp body extends between said venting hole and said opening.

9. A vehicular lamp comprising:

a lamp body having a lamp chamber with a front opening portion;

a lens attached to said front opening portion of the lamp body to define said lamp chamber;

a reflector and a light source disposed within said lamp chamber; and an extension for covering a gap formed between an inner face of said lamp body and said reflector, said extension including a lower frame portion which is not visible through said lens when viewed from outside of said lamp body, wherein said extension has an opening therein for communicating an area proximate to an inner face of said lens with a back area behind said extension.

10. A vehicular lamp comprising:

a lamp body having a lamp chamber with a front opening portion;

a lens attached to said front opening portion of the lamp body to define said lamp chamber;

a reflector and a light source disposed within said lamp chamber; and an extension, within said lamp chamber, for covering a gap formed between an inner face of said lamp body and said reflector, wherein said extension has an opening therein for communicating an area proximate to an inner face of said lens with a back area that is behind said extension, where said back area is within said lamp chamber, and wherein said lamp body is provided with a venting hole for communicating between an inside and an outside of said lamp body, and said venting hole is located in opposition to said opening.

* * * * *